United States Patent
Sanada et al.

(10) Patent No.: US 7,436,897 B2
(45) Date of Patent: Oct. 14, 2008

(54) OFDM RECEIVING APPARATUS AND RECEIVING METHOD THEREOF

(75) Inventors: Yukitoshi Sanada, Tokyo (JP); Masayoshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 685 days.

(21) Appl. No.: 10/784,175

(22) Filed: Feb. 24, 2004

(65) Prior Publication Data
US 2004/0233841 A1    Nov. 25, 2004

(30) Foreign Application Priority Data
Mar. 11, 2003 (JP) ............................. 2003-065374

(51) Int. Cl.
*H04B 7/08* (2006.01)
*H04J 11/00* (2006.01)
(52) U.S. Cl. .................. 375/267; 370/208; 370/210
(58) Field of Classification Search ................. 375/144, 375/148, 260, 267, 347; 370/208, 210, 355, 370/342; 455/133, 136, 138, 140, 277.1
See application file for complete search history.

(56) References Cited

U.S. PATENT DOCUMENTS

| | | | |
|---|---|---|---|
| 6,249,250 B1 * | 6/2001 | Namekata et al. ............ 342/372 |
| 6,512,738 B1 * | 1/2003 | Namekata et al. ........... 370/210 |
| 2002/0181421 A1 * | 12/2002 | Sano et al. ................... 370/335 |
| 2003/0002471 A1 * | 1/2003 | Crawford et al. ............ 370/343 |
| 2006/0166634 A1 * | 7/2006 | Ido .......................... 455/277.1 |

OTHER PUBLICATIONS

Yoichi Matsumoto et al., "OFDM Subchannel Space-Combining Transmission Diversity for TDMA-TDD Broadband Mobile Radio Communications Systems", The Institute of Electronics, Information and Communication Engineers, pp. 129-136, 1998.

* cited by examiner

*Primary Examiner*—Young T. Tse
(74) *Attorney, Agent, or Firm*—Oblon, Spivak, McClelland, Maier & Neustadt, P.C.

(57) ABSTRACT

An Orthogonal Frequency Division Multiplexing (OFDM) receiving apparatus having a sub-carrier selectively combining mode and an antenna selecting mode. The sub-carrier selectively combining mode is configured to selectively combine signals for each sub-carrier. The antenna selecting mode is configured to select a receiving antenna. The OFDM receiving apparatus operates in a proper operation mode based on a communication environment. As a result, in a poor communication environment, signals are selectively combined for each sub-carrier. However, in a relatively satisfactory communication environment, unnecessarily operation of an RF and IF circuit, an A/D converter, and a DDT connected to each receiving antenna may be avoided.

9 Claims, 6 Drawing Sheets

OFDM RECEIVING APPARATUS AND RECEIVING METHOD THEREOF

CROSS REFERENCE TO RELATED APPLICATIONS

The present document is based on Japanese Priority Application JP2003-065374, filed in the Japanese Patent Office on Mar. 11, 2003, the contents in which being incorporated herein by reference to the extent permitted by law.

BACKGROUND OF THE INVENTION

1. Field of the Invention

The present invention relates to a receiving apparatus based on Orthogonal Frequency Division Multiplexing (OFDM) in which frequencies of sub-carriers are orthogonally assigned each other in each symbol period, in particular, to an OFDM receiving apparatus and a receiving method thereof for performing diversity receiving so as to obtain a channel characteristic that allows a second or later delay wave to be cancelled or weakened.

More specifically, the present invention relates to an OFDM receiving apparatus and a receiving method thereof for performing selective diversity receiving for signals with a plurality of antenna elements for each sub-carrier so as to improve a frequency characteristic, in particular, to an OFDM receiving apparatus and a receiving method thereof for performing selectively diversity receiving based on a condition of a transmission path and in consideration of power consumption of the receiving apparatus.

2. Description of Related Art

In recent years, mobile communication apparatuses such as cellular phones and in car telephones are increasingly used and on demand. Nowadays, most people are using mobile communication apparatuses, which are increasingly being recognized as essential on their social lives. However, when wireless transmission is performed in a mobile transmission environment, the quality of transmission signals is remarkably deteriorated due to fading.

As a technology for accomplishing high-speed, high-quality wireless transmission, the so-called Orthogonal Frequency Division Multiplexing (OFDM) system has attracted attention. The OFDM system is one type of multi-carrier transmission system. Frequencies of each carrier are orthogonally assigned each other in each symbol period.

As an example of information transmission based on the OFDM system, serial information that has been transmitted is converted into parallel information in each symbol period that is lower than the information transmission rate. A plurality of parallel data is assigned to respective carriers. The parallel data of each carrier is modulated. Inverse Fast Fourier Transform is performed for the modulated data of each carrier. As a result, the data is converted into time domain signals while the orthogonality of carriers is kept in the frequency domain. The resultant time domain signals are transmitted.

For example, when data of each sub-carrier is modulated based on Binary Phase Shift Keying (BPSK) and a serial signal is converted into parallel signal in a symbol period that is 1/256 of the information transmission speed, the number of carriers is 256. As a result, the inverse FFT is performed for 256 carriers (or sub-carriers). The demodulation is performed in a reverse manner, that is, the FFT is performed for a signal in the time domain, which is converted into a signal in the frequency domain. Signals of individual carriers are demodulated based on modulating systems corresponding thereto and information of the original serial signal is reproduced.

Experimental results show that the OFDM transmission system has a satisfactory transmission characteristic in the environment in which a delay wave is present. For example, the IEEE 802.11a standard, which is well known as a wireless LAN standard, uses the OFDM system in a 5 GHz band to accomplish a transmission rate of up to 54 Mbps.

When a same volume of data is transmitted, the OFDM transmission system has a longer symbol period than the single carrier transmission system. As a result, the OFDM transmission system has a characteristic in which it has a resistance against fading such as multi-path fading (in which the delay time difference between incoming waves is large) and selective fading. However, it cannot be said that transmission based on the OFDM system has a strong resistance against flat fading in which the delay time difference between incoming waves is small.

FIG. 1 shows a frequency characteristic of an OFDM signal in a multi-path environment. In a communication path in which a second delay wave (an interference wave such as a reflection wave) having an amplitude $\rho$ and a delay $\tau$ against a first incoming wave (for example, a desired wave such as a direct wave) is received, the OFDM signal has a frequency characteristic in which a signal amplitude is $(1-\rho)$ with every frequency difference $1/\tau$. In particular, when the size of an interleaver is M×N and the carrier interval is $\Delta f_c$, if $M/\tau = \Delta f_c$ or $N/\tau = \Delta f_c$ is satisfied, the amplitudes of code symbols that have been interleaved on the reception end successively decrease. As a result, burst errors take place.

Diversity receiving which uses signals received by a plurality of antenna elements that are disposed in a manner in which correlations of signals become small is effective for signals of carriers in which the amplitude of a reception signal decreases. The diversity reception is exemplified as selective diversity and maximum ratio combining diversity. The selective diversity selectively uses a reception signal that has the strongest power in a plurality of reception signals. The maximum ratio combining diversity demodulates a plurality of reception signals and combines signals having the maximum ratios. When these diversity technologies are compared with respect to the circuit scales of apparatuses, since the selective diversity is capable of combining receiving systems into one after the reception signals have been selected. In contrast, since the maximum ratio combining diversity requires a plurality of receiving systems corresponding to the number of reception signals until the reception signals are demodulated, the scale of the apparatus becomes relatively large.

FIG. 2 shows an example of a structure of an OFDM receiving apparatus that uses an IEEE 802.11a array antenna that selectively combines (selects and combines) reception signals according to a related art of reference, for example, Yoichi Matsumoto, Nobuaki Mochizuki, Masahiro Umehira (joint authorship), "OFDM Sub-Channel Spatial Combining Transmission Diversity for use with TDMA-TDD Broad Band Mobile Wireless Communication System," Technical Report, Rcs 97-209, The Institute of Electronics, Information and Communication Engineers, Japan.

Reception signals received by antenna elements 1-1 to 1-L are down-converted from RF frequency band signals into base band signals by RF and IF circuits 2-1 to 2-L, respectively. Thereafter, the down-converted base band signals are converted into digital signals by corresponding A/D converters 3-1 to 3-L. The digital signals in the time domain are Fourier-transformed by digital Fourier transforming sections (DFTs) 4-1 to 4-L and the converted signals are extracted as signals of individual carriers in the frequency domain.

A selectively combining section 5 compares powers of signals received by receiving systems (each in which is composed of the antenna 1, the RF and IF circuit 2, the A/D converter 3, and the DFT 4) for each sub-carrier. The selectively combining section 5 selects a signal having the maximum power for each sub-carrier. The selected carrier is deinterleaved by a deinterleaver 6. The deinterleaved signal is decoded to original transmission information by a decoder 7.

FIG. 3 illustrates principles by which the OFDM receiving apparatus shown in FIG. 2 selectively combines signals for each sub-carrier. In the following description, for simplicity, in FIG. 3, it is assumed that the number of antenna elements of the array antenna (namely, the number of receiving systems) is two.

FIG. 3 shows powers of carriers of signals received by the antenna elements 1-1 and 1-2. With respect to reception sub-carriers at frequencies f1, f4, and f5, the powers of each sub-carrier received by the antenna element 1-1 are larger than the powers of sub-carriers received by the antenna element 1-2. In contrast, with respect to reception sub-carriers at frequencies f2 and f4, the powers of sub-carriers received by the antenna element 1-2 are larger than the powers of sub-carriers received by the antenna element 1-1.

In such case, with respect to the frequencies f1, f4, and f5, the selectively combining section 5 selects the sub-carriers received by the antenna 1-1, whereas with respect to the frequencies f2 and f4, the selectively combining section 5 selects the sub-carriers received by the antenna 1-2.

When the powers of signals received by the antenna elements of the array antenna are compared, selectively combined for each carrier, the SN ratios (Signal to Noise ratios) for each carrier may be improved, thus, satisfactory receiving performance may be achieved.

However, in the structure of the diversity OFDM receiving apparatus that selects sub-carriers as shown in FIG. 2, it is necessary to extract sub-carriers for each antenna element. As a result, each of the receiving systems has to be provided with an A/D converter and a DFT and they have to be driven as shown in FIG. 2. As a result, the circuit scale of the apparatus becomes large. In addition, when the demodulation and the DFT are operated in all the receiving systems, the power consumption of the entire receiving apparatus becomes considerably large.

In addition, it would not be necessary to selectively combine signals for each sub-carrier in a relatively satisfactory communication environment having a low error rate rather than a multi-path environment in a bad transmission characteristic. As a result, it would be redundant to operate all the receiving systems.

SUMMARY OF THE INVENTION

In view of the foregoing, it would be desirable to provide an optimum OFDM receiving apparatus and a receiving method thereof for performing diversity receiving so as to provide a channel characteristic that allows a second or later delay wave to be cancelled or weakened.

In addition, what is also needed is an optimum OFDM receiving apparatus and a receiving method thereof for performing selective diversity receiving for signals received by a plurality of antenna elements for each sub-carrier so as to improve a frequency characteristic of the reception signals.

Furthermore, what is further needed is an optimum OFDM receiving apparatus and a receiving method thereof for performing selective diversity receiving based on a condition of a transmission path and in consideration of power consumption of the receiving apparatus.

A first aspect of the present invention includes an orthogonal frequency division multiplexing (OFDM) receiving apparatus for selectively using a plurality of OFDM reception signals, having: a plurality of receiving antennas; a plurality of carrier restoring sections disposed corresponding to the plurality of receiving antennas, each of the plurality of carrier restoring sections including: an RF and IF section for down-converting a reception signal from an RF frequency band to a base band signal, a digital converting section for converting an analog base band signal into a digital signal, and a Fourier transform section for Fourier-transforming the digital signal converted by the digital converting section and extracting carriers signals in a frequency domain from the Fourier-transformed digital signal; a sub-carrier selecting section for comparing powers of output signals of the carrier restoring sections for each sub-carrier and selectively combining the powers of the output signals for each sub-carrier; and a power controlling section for controlling power supplied to the plurality of carrier restoring sections connected to the plurality of receiving antennas based on sub-carrier selection information that is output from the sub-carrier selecting section.

The OFDM receiving apparatus may further include a deinterleaver for deinterleaving the digital signal that is output from the digital converting section; and a decoder for decoding the deinterleaved signal.

When the same amount of data is transmitted, the OFDM transmission system has a longer symbol period than the single carrier transmission system. As a result, the OFDM transmission system has a characteristic in which it has a resistance against fading such as multi-path fading (in which the delay time difference between incoming waves is large) and selective fading. In addition, transmission based on the OFDM system has a strong resistance against flat fading in which the delay time difference between incoming waves is small. Furthermore, it is known that diversity receiving that uses signals received by a plurality of receiving antennas that are disposed in the manner that correlations of the signals become small is effective for the flat fading.

When the powers of signals received by the receiving antennas are compared, selectively combined for each sub-carrier, the SN ratios of each carrier may be improved. As a result, according to that technology, a considerably satisfactory receiving performance may be achieved. However, in the structure of the diversity OFDM receiving apparatus that selects carriers, it is necessary to extract sub-carriers for each receiving antennasach of the receiving systems has to be provided with an A/D converter and a DFT and they have to be driven. As a result, the circuit scale of the apparatus becomes large. In addition, when the demodulation and the DFT are operated in all the receiving systems, the power consumption of the entire receiving apparatus becomes considerably large.

In contrast, the OFDM receiving apparatus of the first aspect of the present invention is capable of accomplishing satisfactory receiving performance by selecting sub-carriers. In addition, the power controlling section of the OFDM receiving apparatus may be configured to select a receiving antenna from which a satisfactory reception signal may be obtained from the plurality of receiving antennas based on the sub-carrier selection information and shut off power supplied to at least part of circuits of the carrier restoring sections connected to other than the selected receiving antenna. As a result, since redundant operation of the circuits may be avoided, the power consumption of the receiving apparatus may be reduced.

When the power controlling section shuts off power supplied to all the RF and IF section, the A/D converting section, and the Fourier transforming section of the carrier restoring sections connected to other than the selected receiving antenna, the power consumption of the receiving apparatus may be remarkably reduced. When the power controlling section shuts off power supplied to at least the Fourier transforming section, the power consumption of the receiving apparatus may be sufficiently reduced.

The power controlling section may be configured to select a receiving antenna for each reception packet. The power controlling section may be configured to compare average powers of reception powers of header sections of packets received by the plurality of receiving antennas so as to select a receiving antenna from which a satisfactory reception signal may be obtained. Alternatively, the power controlling section may be configured to compare average powers of reception powers of pilot signals of symbols received by the plurality of receiving antennas so as to select a receiving antenna from which a satisfactory reception signal may be obtained.

An open/close switch may be disposed between each of the plurality of receiving antennas and the corresponding carrier restoring section. A switch controlling section may be configured to turn on an open/close switch corresponding to the selected one of the plurality of receiving antennas and turn off open/close switches corresponding to other than the selected one of the receiving antennas so as to prevent unnecessarily operation of the receiving systems that are not used.

The OFDM receiving apparatus of the first aspect of the present invention may be configured to operate by selecting a sub-carrier selectively combining mode or an antenna selecting mode. The sub-carrier selectively combining mode may be configured to estimate a communication environment based on an average power strength of a reception signal, sub-carrier selection information, and so forth and selectively combine signals based on the communication environment for each sub-carrier. The antenna selecting mode may be configured to select a receiving antenna.

The sub-carrier selectively combining mode may be configured to cause the power controlling section to supply a drive power to the carrier restoring section connected to each of the plurality of receiving antennas and extract carriers from all reception signals and cause the sub-carrier selecting section to selectively combine signals for each sub-carrier.

The receiving antenna selection mode may be configured to select one of the plurality of receiving antennas from which a satisfactory reception signal may be obtained based on the sub-carrier selection information and cause the power controlling section to supply power only to the carrier restoring section that is connected to the selected one of the plurality of receiving antennas. In this case, only a carrier restoring section to which is a drive power is supplied is configured to extract sub-carriers from the reception signal of the corresponding receiving antenna and perform a decoding process for the data. In other words, sub-carriers are not extracted from all reception signals. As a result, since the carrier restoring section does not perform the decoding process, the power consumption of the receiving apparatus may be reduced.

In a multi-path environment in which the transmission characteristic is poor, since the receiving operation is performed in the sub-carrier selectively combining mode, a satisfactory receiving performance with an error rate lower than a predetermined value may be secured. In contrast, in a relatively satisfactory communication environment in which the error rates of reception signals are low, since the receiving operation is performed in the antenna selecting mode, redundancy may be avoided in which all the receiving systems are operated and signals are selectively combined for each sub-carrier. As a result, the power consumption of the receiving apparatus may be reduced.

A second aspect of the present invention includes an OFDM receiving apparatus for selectively using a plurality of OFMD reception signals, the OFDM receiving apparatus having: a plurality of receiving systems, each of which includes a receiving antenna, an RF and IF section for down-converting a reception signal from an RF frequency band to a base band signal, a digital converting section for converting an analog base band signal into a digital signal, and a Fourier transform section for Fourier-transforming the digital signal converted by the digital converting section and extracting carrier signals in a frequency domain from the Fourier-transformed digital signal; a sub-carrier selecting section for comparing powers of output signals of the plurality of receiving systems for each sub-carrier and selectively combining the powers of the output signals for each sub-carrier; a power detecting section, disposed in each of the plurality of receiving systems, for detecting an average power of an output signal of the RF and IF section; a power comparing section for comparing the average powers of the output signals of the RF and IF sections of the plurality of receiving systems; and a power controlling section for controlling power supplied to the A/D converting section and the Fourier transforming section of each of the plurality of receiving systems based on the compared result of the power comparing section.

The OFDM receiving apparatus of the second aspect of the present invention is an example of a modification of the OFDM receiving apparatus of the first aspect of the present invention. In this case, a drive power is supplied only to the A/D converting section and the Fourier transforming section connected to a receiving antenna in which the average power of the reception signal is the maximum. In contrast, power supplied to the A/D converting section and the Fourier transforming section connected to each of the other receiving antennas is shut off. As a result, redundancy may be avoided in which all the receiving systems are operated and signals are selectively combined for each sub-carrier. As a result, the power consumption of the receiving apparatus may be reduced.

In the OFDM receiving apparatus of the second aspect of the present invention, the RF and IF circuits of all the receiving systems have to be constantly operated. As a result, the power consumption of the receiving apparatus of the second aspect is larger than the power consumption of the receiving apparatus of the first aspect. However, when analog signals are received rather than extracting sub-carriers, a receiving antenna is selected. As a result, the selective diversity receiving may be accomplished on real time basis.

A third aspect of the present invention includes an OFDM receiving apparatus for selectively using a plurality of OFMD reception signals, the OFDM receiving apparatus having: a plurality of receiving systems, each of which includes: a receiving antenna, an RF and IF section for down-converting a reception signal from an RF frequency band to a base band signal, a digital converting section for converting an analog base band signal into a digital signal, and a Fourier-transforming section for Fourier-transforming the digital signal converted by the digital converting section and extracting carrier signals in a frequency domain from the Fourier-transformed digital signal; a sub-carrier selecting section for comparing powers of output signals of the plurality of receiving systems for each sub-carrier and selectively combining the powers of the output signals for each sub-carrier; a power detecting section, disposed in each of the plurality of receiving systems, for detecting an average power of an output signal of the A/D converting section; a power comparing section for comparing the average powers of the output signals of the A/D converting sections of the plurality of receiving systems; and a power controlling section for controlling power supplied to the Fourier transforming section of each of the plurality of receiving systems based on the compared result of the power comparing section.

The OFDM receiving apparatus according to the third aspect of the present invention is another example of a modification of the OFDM receiving apparatus of the first aspect of the present invention. In this case, a drive power is supplied only to the Fourier transforming section connected to a receiving antenna in which the average power of the reception signal is the maximum. In contrast, power supplied to the Fourier transforming section connected to each of the other receiving antennas is shut off. As a result, redundancy may be avoided in which all the receiving systems are operated and signals are selectively combined for each sub-carrier. As a result, the power consumption of the receiving apparatus may be reduced.

In the OFDM receiving apparatus of the third aspect of the present invention, the RF and IF circuits and the A/D converters of all the receiving systems have to be constantly operated. As a result, the power consumption of the receiving apparatus of the third aspect is larger than the power consumption of the receiving apparatus of the first aspect. However, since an antenna is selected before extracting sub-carriers, the selective diversity receiving may be accomplished in real time basis.

A fourth aspect of the present invention includes a receiving method for use with an orthogonal frequency division multiplexing (OFDM) receiving apparatus for selectively using a plurality of OFDM reception signals received from a plurality of receiving antennas, the receiving method including the steps of: down-converting reception signals received from the plurality of receiving antennas from RF frequency band signals to base band signals; converting analog base band signals into digital signals; Fourier-transforming the digital signals converted at the digital converting step and extracting carrier signal in a frequency domain from the Fourier-transformed digital signals; comparing powers of output signals of the Fourier-transforming step for each sub-carrier and selectively combining the powers of the output signals for each sub-carrier; and controlling power supplied at the down-converting step, the A/D converting step, the Fourier-transforming step, and the comparing step performed corresponding to the plurality of receiving antennas based on sub-carrier selection information that is output at the sub-carrier selecting step.

A fifth aspect of the present invention is a receiving method for use with an OFDM receiving apparatus for selectively using a plurality of OFMD reception signals received from a plurality of receiving antennas, the receiving method including the steps of: down-converting reception signals received from the plurality of receiving antennas from RF frequency band signals to base band signals; converting analog base band signals into digital signals; Fourier-transforming the digital signals converted at the digital converting step and extracting carrier signals in a frequency domain from the Fourier-transformed digital signals; comparing powers of output signals of the Fourier-transforming step for each sub-carrier and selectively combining the powers of the output signals for each sub-carrier; detecting average powers of output signals of the down-converting step; comparing the average powers of the output signals of the down-converting step; and controlling power supplied at the A/D converting step and the Fourier-transforming step based on the compared result of the power comparing step.

A sixth aspect of the present invention is a receiving method for use with an OFDM receiving apparatus for selectively using a plurality of OFMD reception signals received from a plurality of receiving antennas, the receiving method including the steps of: down-converting reception signals received from the plurality of receiving antennas from RF frequency band signals to base band signals; converting analog base band signals into digital signals; Fourier-transforming the digital signals converted at the digital converting step and extracting carrier signals in a frequency domain from the Fourier-transformed digital signals; comparing powers of output signals of the Fourier transforming step for each sub-carrier and selectively combining the powers of the output signals for each sub-carrier; detecting average powers of output signals of the converting step; comparing the average powers of the output signals of the converting steps; and controlling power supplied at the Fourier transforming step based on the compared result of the power comparing step.

As it will be described in more detail in the following, according to the preferred embodiments of the present invention, an OFDM receiving apparatus is proposed in which it may be possible to improve the frequency characteristic by selectively and diversity-receiving a signal received by a plurality of antenna elements for each sub-carrier.

Also, according to the preferred embodiments of the present invention, an OFDM receiving apparatus is proposed in which it may be possible to perform diversity reception in response to conditions of the transmission path, taking power consumption into consideration.

The present invention proposes an OFDM receiving apparatus having a sub-carrier selectively combining mode and an antenna selecting mode. The sub-carrier selectively combining mode is configured to selectively combine signals for each sub-carrier. The antenna selecting mode is configured to select a receiving antenna. The OFDM receiving apparatus operates in a proper operation mode based on a communication environment. As a result, in a poor communication environment, signals are selectively combined for each sub-carrier. However, in a relatively satisfactory communication environment, unnecessarily operation of an RF and IF circuit, an A/D converter, and a DDT connected to each receiving antenna may be avoided.

BRIEF DESCRIPTION OF THE DRAWINGS

The above and other features and advantages of the present invention will become more apparent from the following description of the presently exemplary preferred embodiment of the present invention taken in conjunction with the accompanying drawings, in which.

DESCRIPTION OF THE PREFERRED EMBODIMENTS OF THE INVENTION

Preferred embodiments of the present invention will be described below, with reference to the accompanying drawings.

Figure 4:
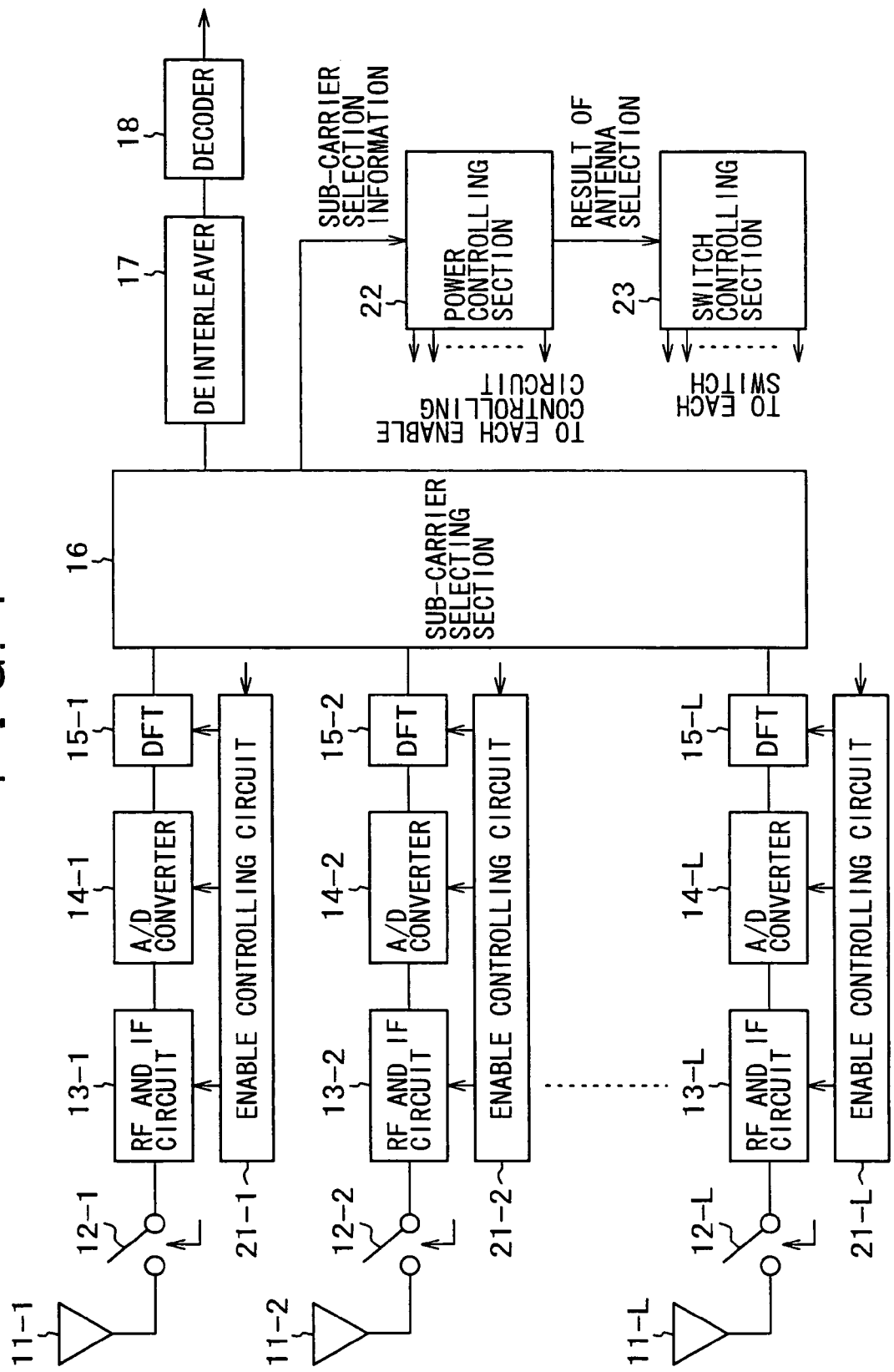
FIG. 4 is a schematic diagram showing a structure of an OFDM receiving apparatus according to a preferred embodiment of the present invention.

FIG. 4 schematically shows a structure of an Orthogonal Frequency Division Multiplexing (OFDM) receiving apparatus according to a preferred embodiment of the present invention. As it will be described later, the OFDM receiving apparatus has a sub-carrier selectively combining mode and an antenna selecting mode. The sub-carrier selectively combining mode is configured to selectively combine (which may conveniently mean select and combine) signals for each sub-carrier. The antenna selecting mode is configured to select an antenna element for receiving a signal.

Antenna elements 11-1 to 11-L have respective directivities that differ from each other. The antenna elements 11-1 to 11-L receive OFDM transmission signals. The reception signals are supplied to RF and IF circuits 13-1 to 13-L through open/close switches 12-1 to 12-L, respectively. In a period of the sub-carrier selectively combining mode, since sub-carriers extracted from the reception signals of the antennas 11-1 to 11-L have to be selectively combined, all the switches 12-1 to 12-L are turned on. In contrast, in a period of the antenna selecting mode, only a switch corresponding to the selected antenna is turned on.

First, the operation of the sub-carrier selectively combining mode will be described. The RF and IF circuits 13-1 to 13-L down-convert reception signals of the antenna elements 11-1 to 11-L from RF frequency signals into base band signals. Thereafter, the down-converted base band signals are converted into digital signals by corresponding A/D converters 14-1 to 14-L. The digital signals in the time domain are Fourier-transformed into signals in the frequency domain by DFTs (Digital Fourier Transform sections) 15-1 to 15-L.

A sub-carrier selecting section 16 compares powers of signals received by receiving systems (each in which is composed of the antenna 11, the RF and IF circuit 13, the A/D converter 14, and the DFT 15) for each sub-carrier. The sub-carrier selecting section 16 selects for example a signal having the maximum power for each sub-carrier.

Figure 1:
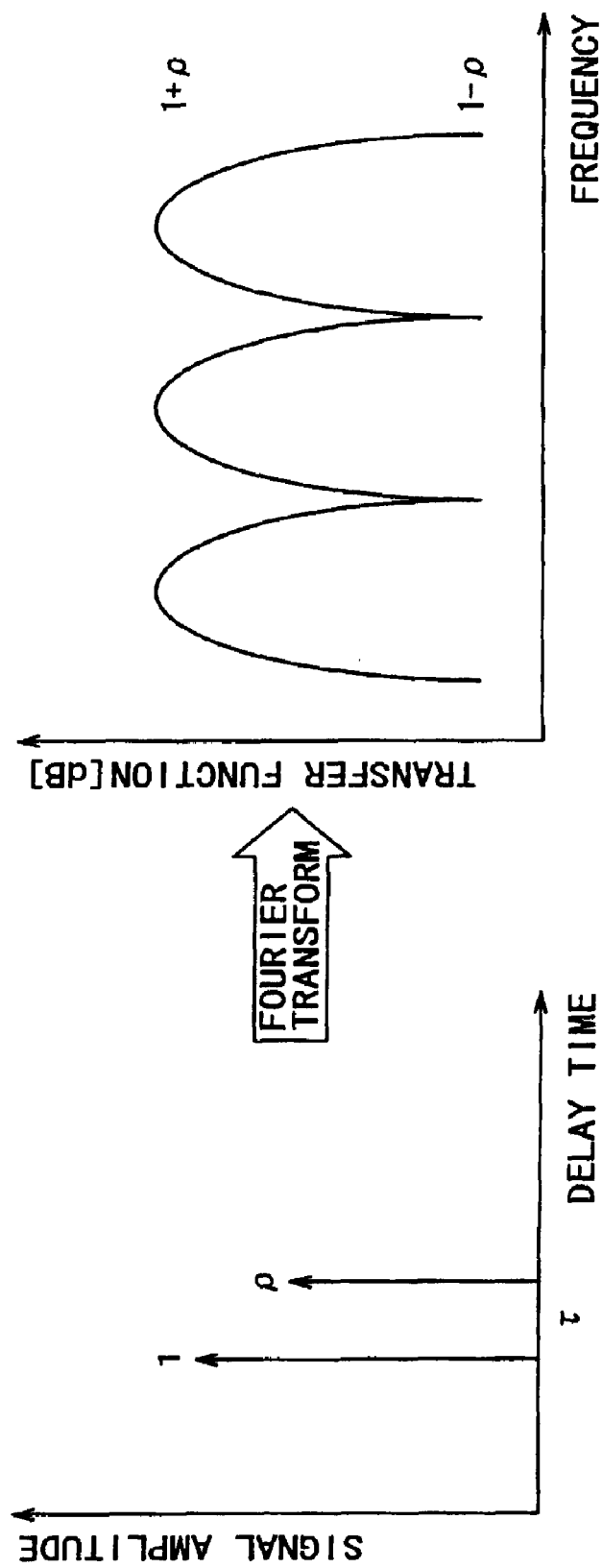
FIG. 1 is a schematic diagram showing frequency characteristic of OFDM signals in a multi-path environment.
Figure 2:
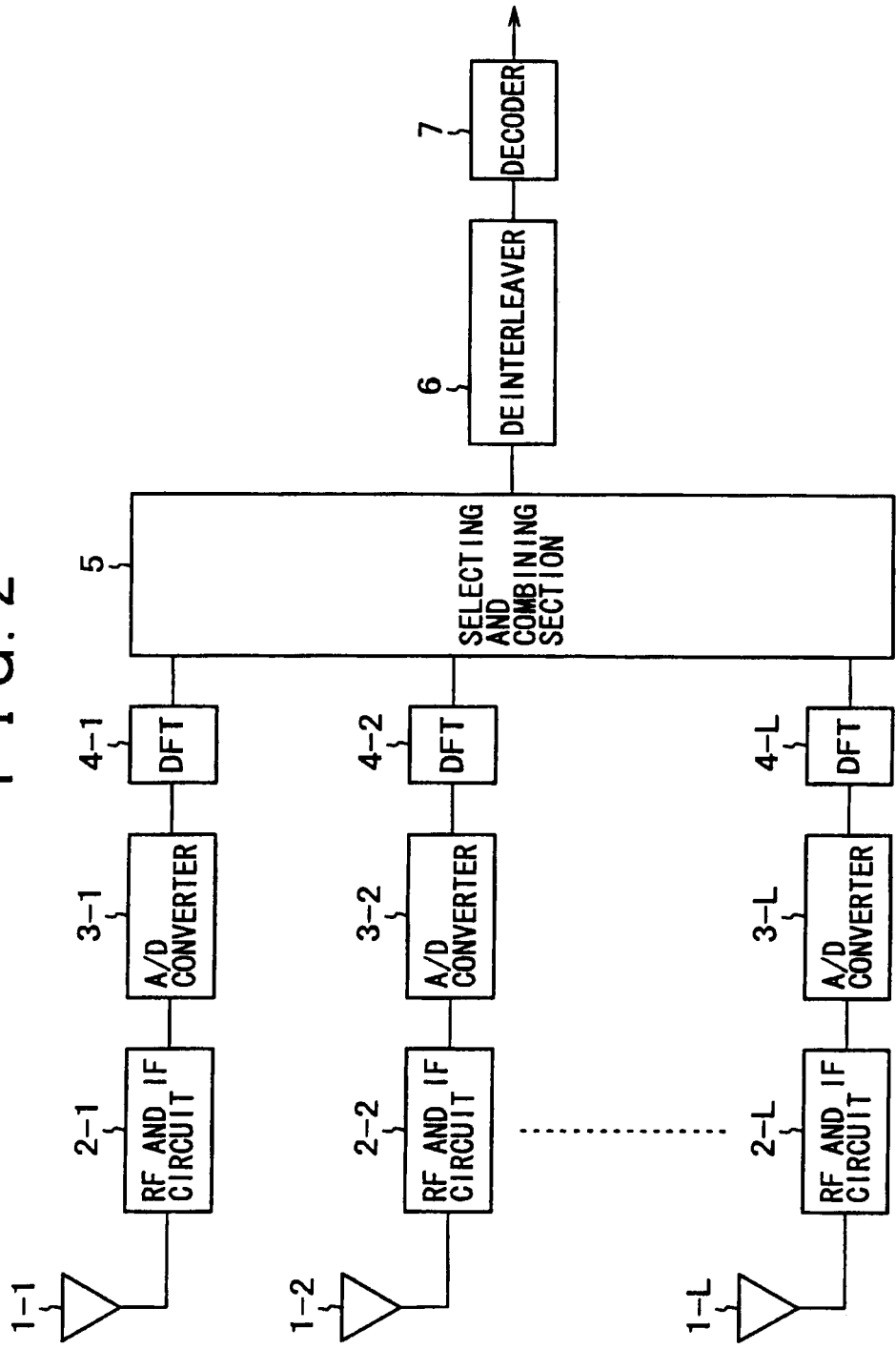
FIG. 2 is a schematic diagram showing an example of a structure of an OFDM receiving apparatus using an IEEE 802.11a array antenna according to the conventional art.
Figure 3:
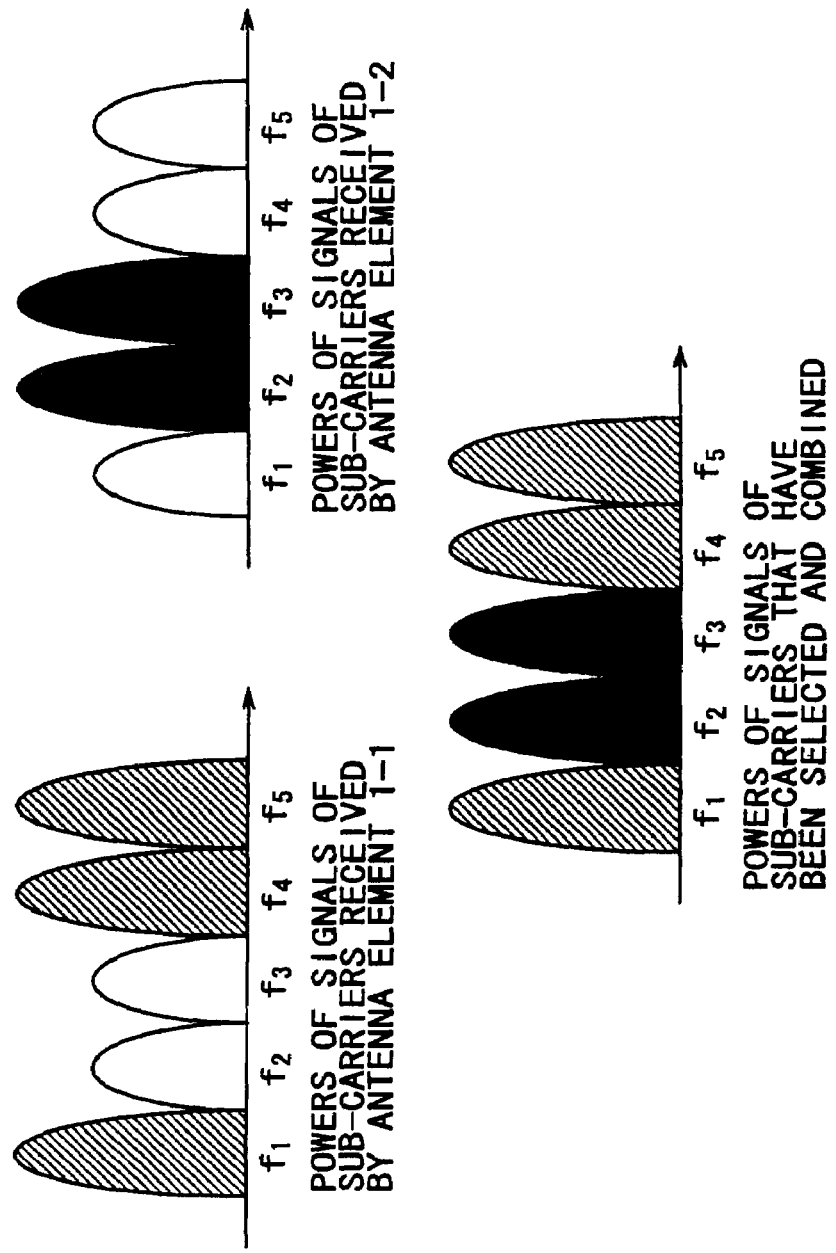
FIG. 3 is a schematic diagram describing a principle by which signals are selectively combined for each sub-carrier by the OFDM receiving apparatus shown in FIG. 2.

The sub-carrier selecting section 16 compares powers of reception signals received by the antenna elements for each sub-carrier and selectively combines the signals. Since the SN ratio of each signal is improved for each sub-carrier, a considerably high receiving characteristic may be obtained. A principle in which signals are selectively combined for each sub-carrier is similar as described with reference to FIG. 3.

Thereafter, a signal of the selected carrier is deinterleaved by a deinterleaver 17. The deinterleaved signal is decoded to original transmission information by a decoder 18.

Next, operation in the antenna selecting mode of the receiving apparatus will be described. As mentioned above, the OFDM receiving apparatus according to the present embodiment has the receiving systems corresponding to the antenna elements 11-1 to 11-L. Each of the receiving systems has circuit modules that extract carriers from a reception signal. The circuit modules are the RF and IF circuit 13, the A/D converter 14, the DFT 15, and the enable controlling circuit 21. The enable controlling circuit 21 controls a driving power supplied to the RF and IF circuit 13, the A/D converter 14, and the DFT 15.

The power supplying operations of all the enable controlling circuits 21-1 to 21-L are controlled by a power controlling section 22. The power controlling section 22 determines the power supply operations for the enable controlling circuits 21-1 to 21-L based on sub-carrier selection information that is output from the sub-carrier selecting section 16. In other words, the power controlling section 22 selects one antenna element from which a satisfactory reception signal may be obtained based on the sub-carrier selection information and supplies a drive power to each circuit module connected to the selected antenna. In addition, the power controlling section 22 outputs a command signal to each of the enable controlling circuits 21-1 to 21-L so as to shut off power supplied to each circuit module connected to each of the other antennas elements. In this case, a data demodulating process and a data decoding process are performed based on a reception signal of the selected antenna.

Since an antenna element is selected by the power controlling section 22 and the enable controlling circuits 21-1 to 21-L, the power consumption of the receiving apparatus may be remarkably-reduced in comparison with the case that carriers are extracted from reception signals of all the antenna elements 11-1 to 11-L and the extracted signals are selectively combined.

The power controlling section 22 repeatedly selects an antenna element for each packet. To select an antenna element from which a satisfactory reception signal may be obtained, the average powers of the reception powers of the header sections of packets received by the antenna elements are compared. Alternatively, the average powers of the reception powers of pilot signals of symbols received by the antenna elements may be compared.

In the antenna selecting mode, the switch controlling section 23 controls on and off operations of the open/close switches 12-1 to 12-L disposed between the antenna elements 11-1 to 11-L and the RF and IF circuits 13-1 to 13-L of the receiving systems, respectively. According to the present embodiment, the switch controlling section 23 turns on the open/close switch of the selected antenna and turns off the open/close switches of the other antenna elements so as to avoid unnecessary operation of the receiving process.

According to the OFDM receiving apparatus shown in FIG. 4, it is possible to switch between the sub-carrier selectively combining mode (for extracting carriers from reception signals of all the antenna elements and selectively combining the extracted signals for each sub-carrier) and the antenna selecting mode (for selecting an antenna element for which a reception signal is processed).

The operation modes may be switched based on a communication environment. In other words, the power controlling section 22 estimates a communication environment based on the average power strengths of reception signals, sub-carrier selection information, and so forth. In a multi-path environment in which the transmission characteristic is poor, the power controlling section 22 performs the receiving operation in the sub-carrier selectively combining mode. In contrast, in a relatively satisfactory communication environment in which the error rates of reception signals are low, the power controlling section 22 performs the receiving operation in the antenna selecting mode.

In the sub-carrier selectively combining mode, the power controlling section 22 supplies a drive power to the circuit modules of all the receiving systems so as to extract carriers from reception signals of the antenna elements 11-1 to 11-L. The sub-carrier selecting section 16 selectively combines signals for each sub-carrier.

As a result, in a multi-path environment in which the transmission characteristic is poor, a receiving performance in which the error rates of reception signals are suppressed to a predetermined value may be secured.

In the antenna selecting mode, an antenna element from which a satisfactory reception signal may be obtained is selected based on the sub-carrier selection information of the sub-carrier selecting section 16. The power controlling section 22 outputs a command signal to the enable controlling circuits 21-1 to 21-L so as to supply power to a receiving system corresponding to an antenna element from which a satisfactory reception signal is obtained. In this case, sub-carriers are obtained from a reception signal of an antenna element corresponding to a receiving system to which the power is supplied and then decoding is processed.

As a result, in a relatively satisfactory communication environment in which error rates of reception signals are low, it becomes possible to avoid redundant operations of selectively combining signals for each sub-carrier in all receiving systems. As a result, the power consumption of the receiving apparatus may be reduced.

Figure 5:
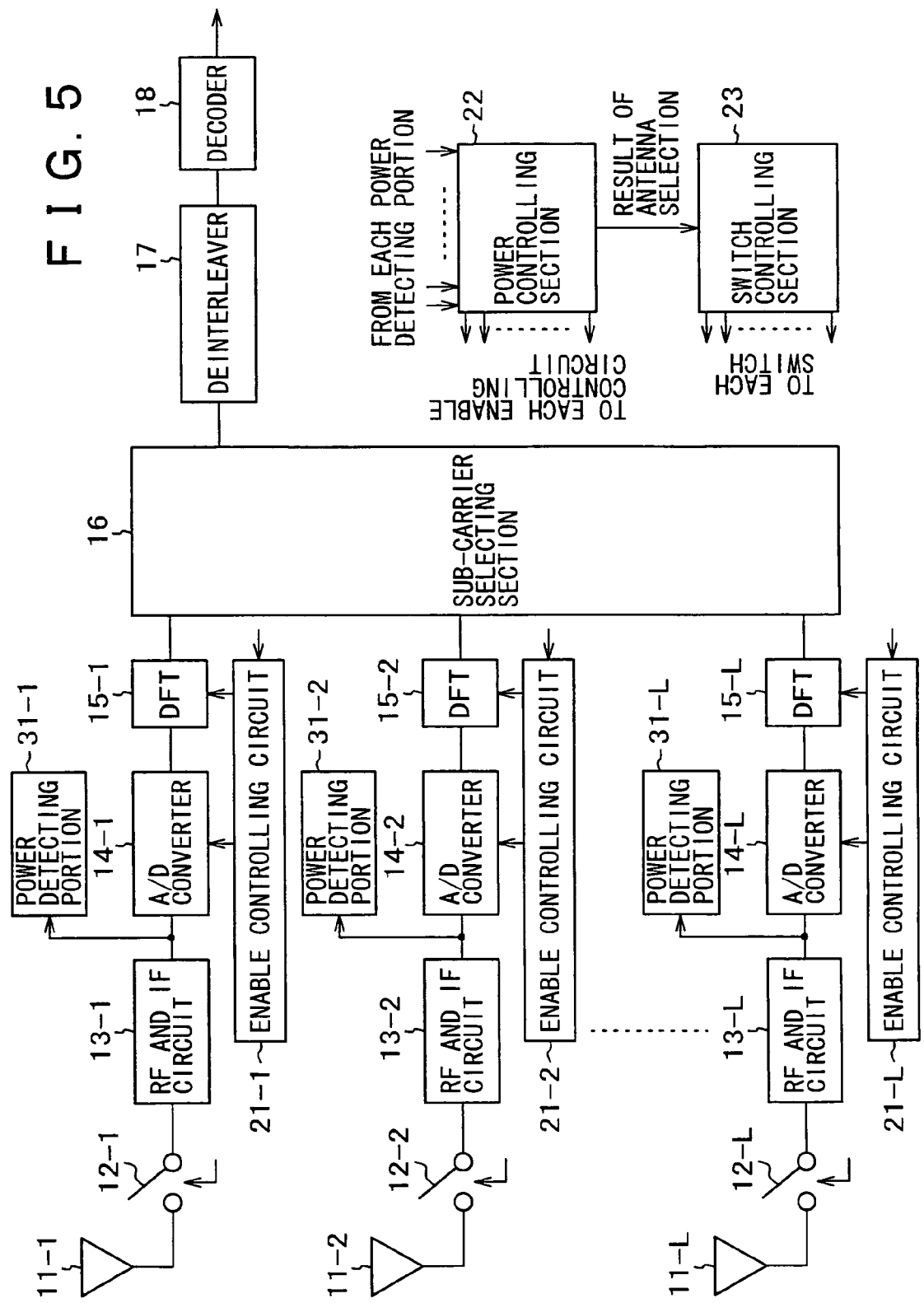
FIG. 5 is a schematic diagram showing a structure of an OFDM receiving apparatus according to another preferred embodiment of the present invention.

FIG. 5 schematically shows a structure of an OFDM receiving apparatus according to another preferred embodiment of the present invention. As it will be described later, the OFDM receiving apparatus has a sub-carrier selectively combining mode and an antenna selecting mode. The sub-carrier selectively combining mode is configured to selectively combine signals for each sub-carrier. The antenna selecting mode is configured to select an antenna element.

Antenna elements 11-1 to 11-L have respective directivities that are different from each other. The antenna elements 11-1 to 11-L receive OFDM transmission signals. The reception signals are supplied to RF and IF circuits 13-1 to 13-L through open/close switches 12-1 to 12-L, respectively. In a period of the sub-carrier selectively combining mode, since sub-carriers extracted from the reception signals of the antennas 11-1 to 11-L have to be selectively combined, all the switches 12-1 to 12-L are turned on. In contrast, in a period of the antenna selecting mode, only a switch corresponding to the selected antenna is turned on.

First, the operation of the sub-carrier selectively combining mode will be described. The RF and IF circuits 13-1 to 13-L down-convert reception signals of the antenna elements 11-1 to 11-L from RF frequency signals into base band signals. Thereafter, the down-converted base band signals are converted into digital signals by corresponding A/D converters 14-1 to 14-L. The digital signals in the time domain are Fourier-transformed into carriers in the frequency domain by Digital Fourier Transforming sections (DFTs) 15-1 to 15-L.

A sub-carrier selecting section 16 compares powers of signals received by receiving systems each in which is composed of the antenna 11, the RF and IF circuit 13, the A/D converter 14, and the DFT 15 for each sub-carrier. The sub-carrier selecting section 16 selects for example a signal having the maximum power for each sub-carrier.

The sub-carrier selecting section 16 compares powers of reception signals received by the antenna elements for each sub-carrier and selectively combines the signals. Since the SN ratio of each signal is improved for each sub-carrier, a considerably high receiving characteristic may be obtained. A principle in which signals are selectively combined for each sub-carrier is similar to that described with reference to FIG. 3.

Thereafter, a signal of the selected carrier is deinterleaved by a deinterleaver 17. The deinterleaved signal is decoded to original transmission information by a decoder 18.

Next, the operation in the antenna selecting mode of the receiving apparatus will be described. In the OFDM receiving apparatus according to the present embodiment, power detecting sections 31-1 to 31-L are disposed corresponding to the receiving systems. The power detecting sections 31-1 to 31-L detect powers of analog signals that are output from the RF and IF circuits 13-1 to 13-L, respectively. In addition, enable controlling circuits 21-1 to 21-L are disposed corresponding to the receiving systems. The enable controlling circuits 21-1 to 21-L control a drive power supplied to the A/D converters 14-1 to 14-L and the DFTs 15-1 to 15-L, respectively.

The power supplying operations of each of the enable controlling circuits 21-1 to 21-L are controlled by a power controlling section 22. The power controlling section 22 determines the power supply operations for the enable controlling circuits 21-1 to 21-L based on reception power strengths of the receiving systems that are output from the power detecting sections 31-1 to 31-L, respectively. In other words, the power controlling section 22 selects one antenna element from which a satisfactory reception signal may be obtained based on the compared result of the reception powers and supplies a drive power to each circuit module connected to the selected antenna. In addition, the power controlling section 22 outputs a command signal to each of the enable controlling circuits 21-1 to 21-L so as to shut off power supplied to each circuit module connected to each of the other antenna elements. In this case, a data demodulating process and a data decoding process are performed based on a reception signal of the selected antenna.

In the antenna selecting mode, the switch controlling section 23 controls on and off operations of the open/close switches 12-1 to 12-L disposed between the antenna elements 11-1 to 11-L and the RF and IF circuits 13-1 to 13-L of the receiving systems, respectively. According to the present embodiment, the switch controlling section 23 turns on the open/close switch of the selected antenna and turns off the open/close switches of the other antenna elements so as to prevent unnecessary operation of the receiving process.

Since an antenna element is selected by the power controlling section 22 and the enable controlling circuits 21-1 to 21-L, the power consumption of the receiving apparatus may be remarkably reduced in comparison with the case that carriers are extracted from reception signals of all the antenna elements 11-1 to 11-L and the extracted signals are selectively combined.

The OFDM receiving apparatus according to the second embodiment of the present invention supplies a drive power only to an A/D converter 14 and a DFT 15 connected to an antenna element having the maximum reception power detected using outputs of the RF and IF circuits 13-1 to 13-L. The OFDM receiving apparatus shuts off power supplied to A/D converting sections and Fourier transforming sections connected to the other antenna elements. As a result, redundancy in which signals are selectively combined for each sub-carrier by all the receiving systems may be avoided. As a result, the power consumption of the receiving apparatus may be reduced.

In the OFDM receiving apparatus according to another preferred embodiment of the present invention, the RF and IF circuits 13-1 to 13-L of all the receiving systems have to be constantly operated. As a result, the power consumption of the receiving apparatus according to such embodiment is larger than the power consumption of the receiving apparatus according to the first of the above-mentioned embodiments. However, when analog signals are received rather than extracting sub-carriers, an antenna element is selected. As a result, the selective diversity receiving may be accomplished on a real time basis.

Figure 6:
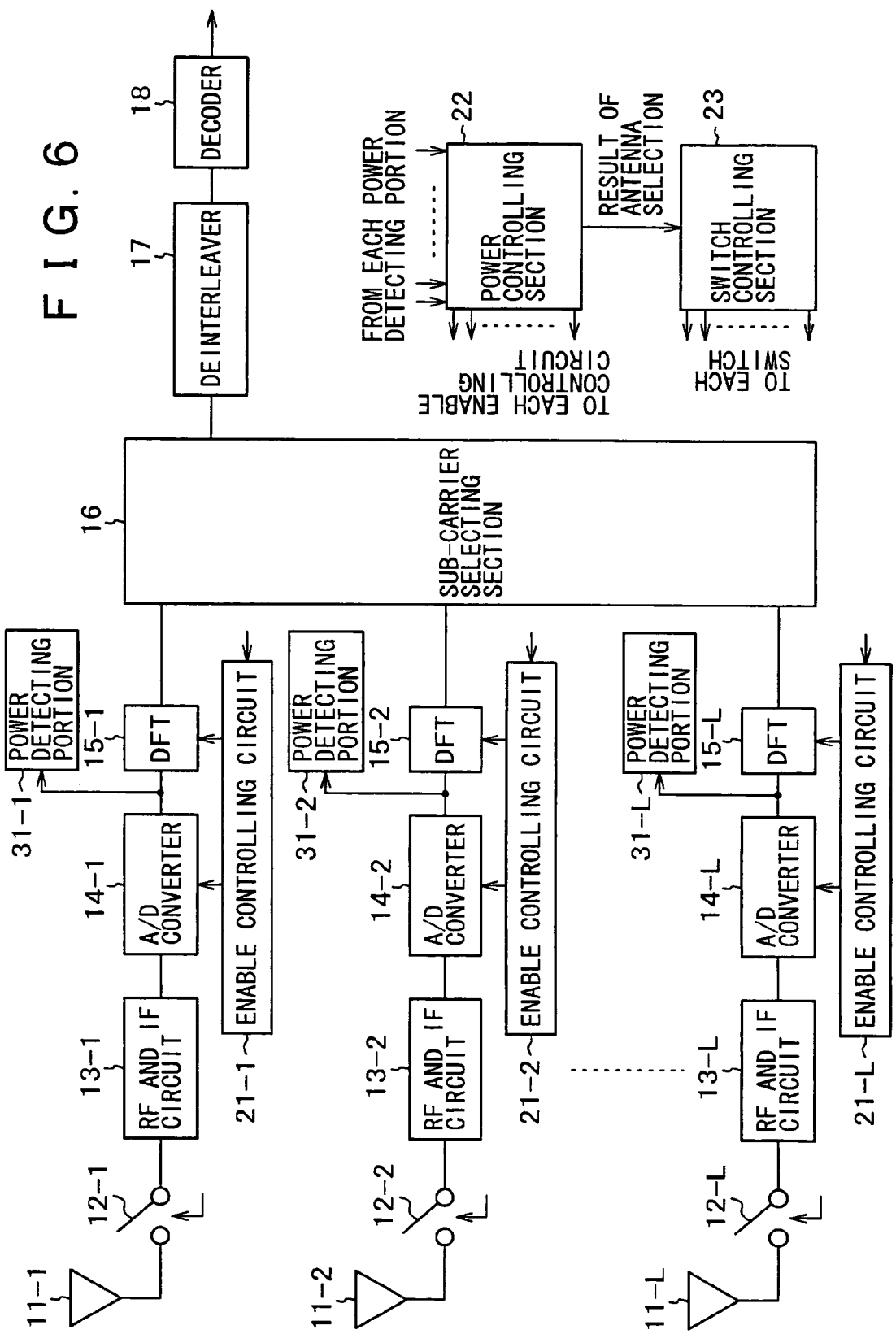
FIG. 6 is a schematic diagram showing a structure of an OFDM receiving apparatus according to another preferred embodiment of the present invention.

FIG. 6 schematically shows a structure of an OFDM receiving apparatus according to still another preferred embodiment of the present invention. As it will be described later, the OFDM receiving apparatus has a sub-carrier selectively combining mode and an antenna selecting mode. The sub-carrier selectively combining mode is configured to selectively combine signals for each sub-carrier. The antenna selecting mode is configured to select an antenna element.

Antenna elements 11-1 to 11-L have respective directivities that are different from each other. The antenna elements 11-1 to 11-L receive OFDM transmission signals. The reception signals are supplied to RF and IF circuits 13-1 to 13-L through open/close switches 12-1 to 12-L, respectively. In a period of the sub-carrier selectively combining mode, since sub-carriers extracted from the reception signals of the antennas 11-1 to 11-L have to be selectively combined, all the switches 12-1 to 12-L are turned on. In contrast, in a period of the antenna selecting mode, only a switch corresponding to a selected antenna is turned on.

First, the operation of the sub-carrier selectively combining mode will be described. The RF and IF circuits 13-1 to 13-L down-convert reception signals of the antenna elements 11-1 to 11-L from RF frequency signals into base band signals. Thereafter, the down-converted base band signals are converted into digital signals by corresponding A/D converters 14-1 to 14-L. The digital signals in the time domain are Fourier-transformed into carriers in the frequency domain by Digital Fourier Transforming sections (DFTS) 15-1 to 15-L.

A sub-carrier selecting section 16 compares powers of signals received by receiving systems each in which is composed of the antenna 11, the RF and IF circuit 13, the A/D converter 14, and the DFT 15 for each sub-carrier. The sub-carrier selecting section 16 selects for example a signal having the maximum power for each sub-carrier.

The sub-carrier selecting section 16 compares powers of reception signals received by the antenna elements for each sub-carrier and selectively combines the signals. Since the SN ratio of each signal is improved for each sub-carrier, a considerably high receiving characteristic may be obtained. A principle in which signals are selectively combined for each sub-carrier is similar to that described with reference to FIG. 3.

Thereafter, a signal of the selected carrier is deinterleaved by a deinterleaver 17. The deinterleaved signal is decoded to original transmission information by a decoder 18.

Next, the operation in the antenna selecting mode of the receiving apparatus will be described. In the OFDM receiving apparatus according to the present embodiment, power detecting sections 31-1 to 31-L are disposed corresponding to the receiving systems. The power detecting sections 31-1 to 31-L detect powers of digital signals that are output from the A/D converters 14-1 to 14-L, respectively. In addition, enable controlling circuits 21-1 to 21-L are disposed corresponding to the receiving systems. The enable controlling circuits 21-1 to 21-L control a drive power supplied to the DFTs 15-1 to 15-L, respectively.

The power supplying operations of all the enable controlling circuits 21-1 to 21-L are controlled by a power controlling section 22. The power controlling section 22 determines the power supply operations for the enable controlling circuits 21-1 to 21-L based on reception power strengths of the receiving systems that are output from the power detecting sections 31-1 to 31-L, respectively. In other words, the power controlling section 22 selects one antenna element from which a satisfactory reception signal may be obtained based on the compared result of the reception powers and supplies a drive power to each circuit module connected to the selected antenna. In addition, the power controlling section 22 outputs a command signal to each of the enable controlling circuits 21-1 to 21-L so as to shut off power supplied to each circuit module connected to each of the other antennas. In this case, a data demodulating process and a data decoding process are performed based on a reception signal of the selected antenna.

The switch controlling section 23 controls on and off operations of the open/close switches 12-1 to 12-L disposed between the antenna elements 11-1 to 11-L and the RF and IF circuits 13-1 to 13-L of the receiving systems, respectively. According to the present embodiment, the switch controlling section 23 turns on the open/close switch of the selected antenna and turns off the open/close switches of the other antenna elements so as to avoid unnecessary performance of receiving process.

Since an antenna element is selected by the power controlling section 22 and the enable controlling circuits 21-1 to 21-L, the power consumption of the receiving apparatus may be remarkably reduced in comparison with the case that carriers are extracted from reception signals of all the antenna elements 11-1 to 11-L and the extracted signals are selectively combined.

The OFDM receiving apparatus according to such third preferred embodiment of the present invention supplies drive power only to a DFT 15 connected to an antenna element having the maximum reception power detected using outputs of the A/D converting sections 14-1 to 14-L. The OFDM receiving apparatus shuts off power supplied to DFTs 15 connected to the other antenna elements. As a result, redundancy in which signals are selectively combined for each sub-carrier by all the receiving systems may be avoided. As a result, the power consumption of the receiving apparatus may be reduced.

In the OFDM receiving apparatus according to the preferred embodiment of the present invention just described, the RF and IF circuits 13-1 to 13-L and the A/D converters 14-1 to 14-L of all the receiving systems have to be constantly operated. As a result, the power consumption of the receiving apparatus according to the third embodiment is larger than the power consumption of the receiving apparatus according to the first embodiment. However, when analog signals are received rather than extracting sub-carriers, an antenna element is selected. As a result, the selective diversity receiving may be accomplished on a real time basis.

In the foregoing description, it was assumed that an antenna or array of antennas disposed in the receiving apparatus according to each embodiment of the present invention performs diversity reception. The physical configuration of the antenna may have a plurality of antenna elements and the antenna disposed in the receiving apparatus may be an array of antennas and/or antenna elements or a plurality of independent antennas and/or antenna elements.

The foregoing describes the present invention by giving reference to specific examples of preferred embodiments thereof. However, it should be noted that although not explicitly described or shown in any of the preferred embodiments presented herein, it should be clear to those skilled in the art that various and any modifications, variations, combinations and sub combinations of the embodiments may be devised which embody the principles and are within the spirit and scope of the of the present invention.

What is claimed is:

1. An orthogonal frequency division multiplexing (OFDM) receiving apparatus for selectively using a plurality of orthogonal frequency division multiplexing reception signals, said orthogonal frequency division multiplexing receiving apparatus comprising:

a plurality of receiving antennas;
a carrier restoring section provided for each of said plurality of receiving antennas, said each carrier restoring section including:
  a radio frequency and intermediate frequency section configured to down-convert an OFDM reception signal from a radio frequency signal to a baseband signal,
  a digital converter configured to convert an analog baseband signal received from the radio frequency and intermediate frequency section into a digital signal, and
  a Fourier-transform section configured to Fourier-transform said digital signal converted by said digital converter and extract a carrier in frequency domain from said Fourier-transformed digital signal;
a sub-carrier selecting section configured to compare powers of output signals from said each carrier restoring section provided for each sub-carrier, and selectively combine the powers of said output signals for each sub-carrier; and
a power controlling section configured to control power supplied to said each carrier restoring section, based on sub-carrier selection information from said sub-carrier selecting section.

2. The orthogonal frequency division multiplexing receiving apparatus as set forth in claim 1, further comprising:
  a deinterleaver configured to deinterleave the digital signal output from said digital converter; and
  a decoder configured to decode said deinterleaved signal.

3. The orthogonal frequency division multiplexing receiving apparatus as set forth in claim 1, wherein said power controlling section is configured to select a receiving antenna for signal reception based on said sub-carrier selection information, and shut off power supplied to at least part of other connected circuits of said carrier restoring section.

4. The orthogonal frequency division multiplexing receiving apparatus as set forth in claim 3, wherein said power controlling section is configured to shut off power supplied to part of circuits of said carrier restoring section connected to a receiving antenna other than the selected receiving antenna, including said Fourier-transform section.

5. The orthogonal frequency division multiplexing receiving apparatus as set forth in claim 3, wherein said power controlling section is configured to select a receiving antenna from which a satisfactory reception signal can be obtained, by comparing average powers of reception powers of header sections of packets received by each of said plurality of receiving antennas.

6. The orthogonal frequency division multiplexing receiving apparatus as set forth in claim 3, wherein said power controlling section is configured to select a receiving antenna from which a satisfactory reception signal is obtained, by comparing average powers of reception powers at each receiving antenna related to a pilot signal introduced to each of a symbol.

7. The orthogonal frequency division multiplexing receiving apparatus as set forth in claim 3, further comprising:
  an open/close switch coupled between each of said plurality of receiving antennas and said each carrier restoring section; and
  a switch controlling section configured to turn an open/close switch corresponding to said selected receiving antenna on and turn open/close switches of other receiving antennas off.

8. The orthogonal frequency division multiplexing receiving apparatus as set forth in claim 3, further comprising:
  a sub-carrier selectively combining mode configured to cause said power controlling section to supply drive power to all said each carrier restoring section connected to each of said plurality of receiving antennas and extract carriers from all OFDM reception signals, and selectively combine signals for each sub-carrier at said sub-carrier selecting section; and
  an antenna selection mode configured to select one of said plurality of receiving antennas from which a satisfactory reception signal is obtained, based on said sub-carrier selection information and cause said power controlling section to supply power only to said carrier restoring section that is connected to said selected antenna.

9. A receiving method for selectively using a plurality of orthogonal frequency division multiplexing (OFDM) reception signals received from a plurality of receiving antennas, said method comprising:
  down-converting an OFDM reception signal received from at least one of said plurality of receiving antennas from a radio frequency signal to a baseband signal;
  converting said baseband signal into a digital signal;
  Fourier-transforming the digital signal converted at said converting step;
  extracting a signal of sub-carrier in a frequency domain from said Fourier-transformed digital signal;
  comparing powers of output signals of said Fourier-transforming step for each sub-carrier and selectively combining the powers of the output signals for each sub-carrier; and
  controlling power supplied at said down-converting step, converting step, and said Fourier-transforming step, based on sub-carrier selection information from said comparing step.

* * * * *